United States Patent
Chacko et al.

(10) Patent No.: US 9,338,107 B2
(45) Date of Patent: May 10, 2016

(54) TRANSFERRING MESSAGE CONTEXT INFORMATION USING EXTENDED SIMPLE MAIL TRANSFER PROTOCOL BINARY DATA CHUNKING

(75) Inventors: Arunkumar Chacko, Redmond, WA (US); Gregory Gourevitch, Redmond, WA (US); Wilbert de Graaf, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 13/438,852

(22) Filed: Apr. 4, 2012

(65) Prior Publication Data

US 2013/0268600 A1 Oct. 10, 2013

(51) Int. Cl.
*G06F 15/16* (2006.01)
*H04L 12/58* (2006.01)

(52) U.S. Cl.
CPC .................... *H04L 51/066* (2013.01)

(58) Field of Classification Search
CPC ....... H04L 51/066; H04L 51/34; H04L 51/30; H04L 12/5875; H04L 51/28; H04L 12/5885
USPC ........................................................ 709/206
See application file for complete search history.

(56) References Cited

U.S. PATENT DOCUMENTS

| 6,035,327 | A | 3/2000 | Buckley et al. |
| 8,543,562 | B2 * | 9/2013 | Mule ................ G06F 17/30047 707/706 |
| 2004/0123242 | A1 | 6/2004 | McKibben et al. |
| 2004/0205216 | A1 | 10/2004 | Ballinger et al. |
| 2006/0168017 | A1 | 7/2006 | Stern et al. |
| 2007/0214219 | A1 | 9/2007 | Chen |
| 2007/0283164 | A1 * | 12/2007 | Nishizawa .......... H04L 63/0861 713/186 |
| 2011/0122882 | A1 | 5/2011 | Wang |

OTHER PUBLICATIONS

"SMTP Protocol Extensions", Nov. 3, 2006, Retrieved at <<http://technet.microsoft.com/en-us/library/bb123786%28EXCHG.65%29.aspx>>, pp. 8.

"Large Data and Streaming", Retrieved at <<http://msdn.microsoft.com/en-us/library/ms733742.aspx>>, Sep. 19, 2008, pp. 9.

(Continued)

*Primary Examiner* — Khanh Dinh
*Assistant Examiner* — Sm Rahman
(74) *Attorney, Agent, or Firm* — Damon Rieth; Tom Wong; Micky Minhas

(57) ABSTRACT

A client computer sends an extended simple mail transfer protocol extended hello command to a server computer. In response, the server computer sends an advertisement to the client computer to identify a capability to receive message context information. The client computer, in turn, analyzes the capability advertisement to determine if it has any blobs associated with the capability identified in the capability advertisement to send. If the client computer has one or more blobs to send, the client computer sends a parameter in a MAIL command to the server computer specifying that the client computer will utilize the capability identified in the capability advertisement and specifying an order in which to expect the blobs if the client computer intends to send more than one blob. The client computer sends the blob(s) to the server computer after receiving an indication that the server computer is ready to receive the blob(s).

20 Claims, 5 Drawing Sheets

(56) References Cited

OTHER PUBLICATIONS

Moore, K., "Simple Mail Transfer Protocol (SMTP) Service Extension for Delivery Status Notifications (DSNs)", Retrieved at <<http://svn.tools.ietf.org/pdf/rfc3461.pdf>>, Jan. 2003, pp. 39.

Vaudreuil, G., "SMTP Service Extensions for Transmission of Large and Binary MIME Messages", Retrieved at <<http://tools.ietf.org/pdf/rfc3030.pdf>>, Dec. 2000, pp. 13.

"SMTP, Simple Mail Transfer Protocol", Retrieved at http://www.networksorcery.com/enp/protocol/smtp.htm on Aug. 12, 2013; pp. 12.

* cited by examiner

TRANSFERRING MESSAGE CONTEXT INFORMATION USING EXTENDED SIMPLE MAIL TRANSFER PROTOCOL BINARY DATA CHUNKING

BACKGROUND

Simple mail transfer protocol ("SMTP") is used for e-mail communications between computers. In some cases, additional information is required to be transferred between a client and a server. In other cases, the transfer of additional information between a client and a server is not required, but may be otherwise beneficial. Existing SMTP commands and extensions limit the amount of data that can be transferred between a client and a server. More particularly, although SMTP permits the transfer of information via a MAIL command, the MAIL command imposes a size limit that prevents the transfer of arbitrarily sized information.

Extended SMTP ("ESMTP") allows for the addition of SMTP extension commands. Although it is possible to add a new ESMTP extension command to facilitate the transfer of arbitrarily sized information, firewalls are often configured to block unknown ESMTP multi-line extension commands. This dramatically reduces the effectiveness of this type of solution. Enterprise networks in particular are often unable to utilize this type of solution because of the strict firewall parameters typically used on enterprise networks.

It is with respect to these and other considerations that the disclosure made herein is presented.

SUMMARY

Concepts and technologies are described herein for transferring message context information using ESMTP binary data ("BDAT") chunking. In accordance with the concepts and technologies disclosed herein, a client computer connects to a server computer and sends an extended hello ("EHLO") ESMTP command to the server computer. In response, the server computer sends an advertisement to the client computer to identify a capability of the server computer to receive message context information from the client computer. The client computer, in turn, analyzes the capability advertisement to determine if it has any blobs associated with the capability identified in the capability advertisement to send to the server computer. A blob is used herein to identify a serialized/encoded value of some message context information. If the client computer has one or more blobs to send to the server computer, the client computer sends a parameter in a MAIL command to the server computer specifying that the client computer will utilize the capability identified in the capability advertisement. If the client computer intends to send more than one blob, the MAIL command can also specify an order in which the client computer will send the blobs to the server computer. The server computer responds to the client computer indicating that it is ready to receive the blob(s). The client computer then sends the blob(s) to the server computer. If the client computer is sending more than one blob, the client computer sends each blob in the order specified in the MAIL command in a separate BDAT chunk. Since the server computer knows the number of blobs to expect and the order in which the blobs are to be sent, the server computer can deserialize the message context information from each blob appropriately. Any additional BDAT chunks after the message context BDAT chunks are treated by the server computer as message content.

Message context information can change across different versions of software installed on the client computer and/or the server computer, thereby potentially causing incompatibilities between the client computer and the server computer with regard to the exchange of message context information as described above. In some embodiments, the client computer and the server computer are configured to support versioning for blobs. In these embodiments, when the server computer advertises its capability to receive a blob, the server computer can also send the version of the blob it supports. The client computer can inspect the version and determine whether or not to send the blob. If the blob version of the client computer is not compatible with the blob version of the server computer, the client computer can determine to not send the blob.

In some embodiments, the client computer utilizes different logic to determine the compatibility of different blobs. In some embodiments, one or more blobs are considered to be mandatory and the client computer is configured to always send these blobs. In these embodiments, the higher version between the client and the server is configured to perform the conversion from the lower version to the higher version or from the higher version to the lower version, as appropriate. For instance, if a lower version client sends a mandatory blob to a higher version server, the server is configured to perform the up-conversion upon or at a time after receiving the blob. Similarly, if a higher version client tries to send a mandatory blob to a lower version server, the client is configured to down-convert the blob before sending.

In some embodiments, the client computer splits one or more of the blobs into two or more BDAT chunks prior to sending the blobs to the server computer. In these embodiments, the total size of each blob can be specified in the MAIL command so the server computer knows when an entire blob has been received.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
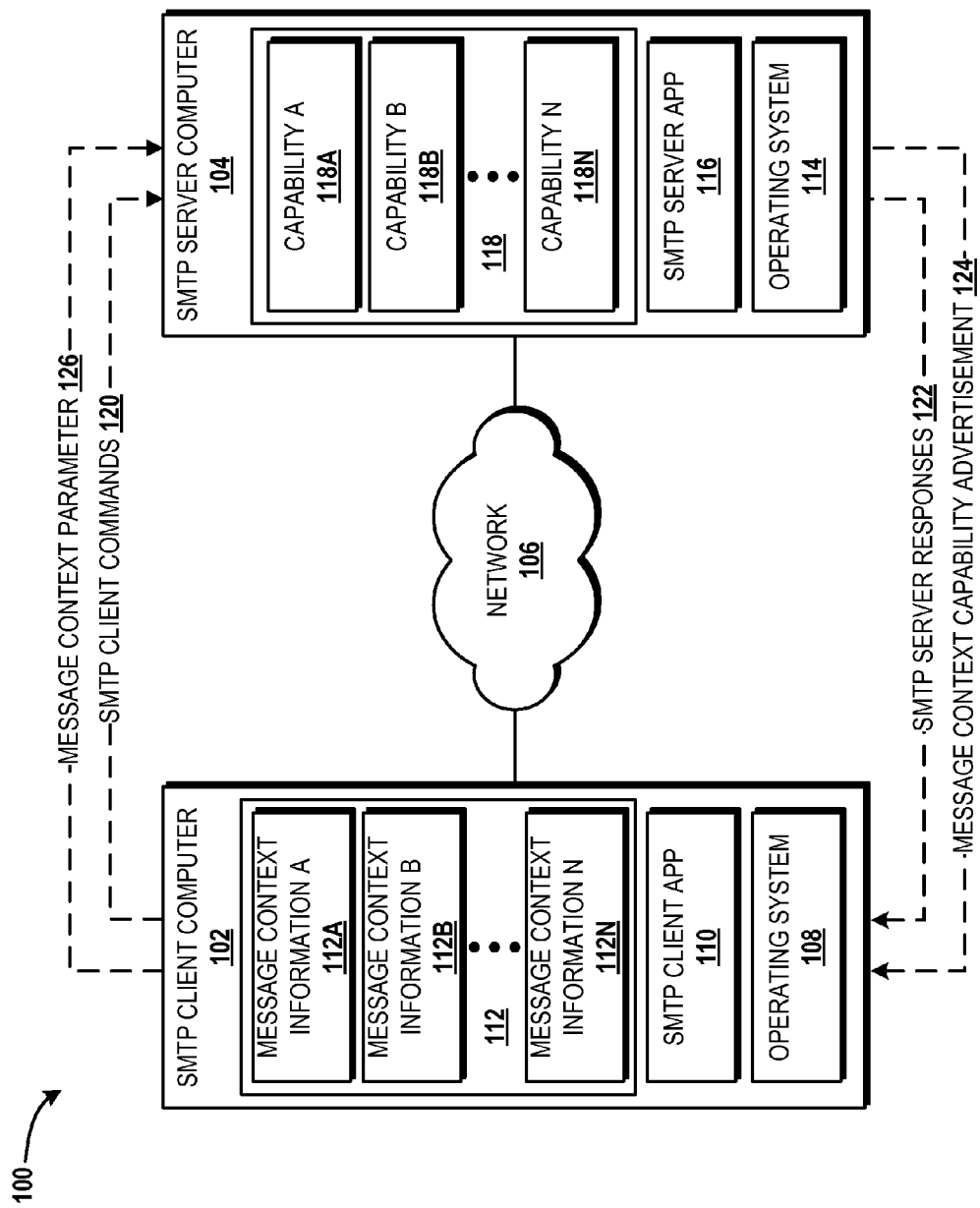
FIG. 1 is a system diagram illustrating an illustrative operating environment for implementing various embodiments presented herein.

The following detailed description is directed to concepts and technologies for transferring message context information using ESMTP BDAT chunking According to one aspect of the concepts and technologies described herein, a client computer connects to a server computer and sends an EHLO ESMTP command to the server computer. In response, the server computer sends an advertisement to the client computer to identify a capability of the server computer to receive message context information from the client computer. The client computer, in turn, analyzes the capability advertisement to determine if it has any blobs associated with the capability identified in the capability advertisement to send to the server computer. If the client computer has one or more blobs to send to the server computer, the client computer sends a parameter in a MAIL command to the server computer specifying that the client computer will utilize the capability identified in the capability advertisement. The MAIL command can also specify an order in which to expect the blobs if the client computer intends to send more than one blob. The server computer responds to the client computer indicating that it is ready to receive the blob(s). The client computer then sends the blob(s) to the server computer. If the client computer is sending more than one blob, the client computer sends each blob in the order specified in the MAIL command in a separate BDAT chunk. Any additional BDAT chunks after the message context BDAT chunks are treated by the server computer as message content.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for transferring message context information using ESMTP BDAT chunking will be presented.

Referring now to FIG. 1, aspects of one operating environment 100 for various embodiments presented herein will be described. The illustrated operating environment 100 includes an SMTP client computer 102 that is in communication with an SMTP server computer 104 via a network 106 to exchange e-mail messages during an ESMTP session. The SMTP client computer 102 and the SMTP server computer 104 each may be a personal computer ("PC"), a desktop workstation, a laptop computer, a tablet computer, a notebook computer, an ultraportable computer, a personal digital assistant ("PDA"), an electronic-book reader, a mobile telephone, a game console, a set-top box, a consumer electronics device, a server computer, or any other type of computing system configured to perform the various operations described herein for transferring message context information using ESMTP BDAT chunking. The network 106 may be an internet, the Internet, a local area network ("LAN"), a campus area network ("CAN"), a metropolitan network ("MAN"), or a wide area network ("WAN"). Moreover, although only a single network is illustrated, it is contemplated that the SMTP client computer 102 and/or the SMTP server computer 104 may be in communication with another network, which facilitates a connection to the network 106.

The SMTP client computer 102 is configured to execute a client operating system 108 and one or more application programs such as, in the illustrated embodiment, an SMTP client application 110. The client operating system 108 is a computer program for controlling the operation of the SMTP client computer 102. The SMTP client application 110 is an executable program configured to execute on top of the client operating system 108 to provide various functionality described herein. In some embodiments, the SMTP client application 110 is a mail transfer agent ("MTA") configured to accept e-mail messages received from another MTA (not shown) or a mail user agent ("MUA"), such as MICROSOFT OUTLOOK, available from Microsoft Corporation of Redmond, Wash., or a web-based e-mail application (also not shown), and transfer the e-mail messages to the SMTP server computer 104. In these embodiments, the SMTP server computer 104 may function as an MTA or a mail delivery agent ("MDA"). In some embodiments, the SMTP client application 110 operates as an MTA for MICROSOFT EXCHANGE, available from Microsoft Corporation of Redmond, Wash. The SMTP client application 110 is configured to utilize SMTP and ESMTP protocols.

The SMTP client application 110 is also configured to transfer additional information, referred to herein as message context information 112, to the SMTP server computer 104 in e-mail messages. The message context information 112 includes any arbitrarily long information that a user, the SMTP client computer 102, the SMTP client application 110, or another application (not shown) desires to send to the SMTP server computer 104. In some embodiments, the message context information 112 is critical in nature such that not providing the message context information 112 to the SMTP server computer 104 may result in improper functioning of some feature or operation. In some embodiments, the message context information 112 is used to improve the performance of some feature or operation. Several examples of features or operations for which the message context information 112 may be used to ensure proper functioning and/or to improve the performance thereof are now described.

As described above, in some embodiments, the SMTP client application 110 operates as an MTA for MICROSOFT EXCHANGE. In these embodiments, the SMTP client application 110 can utilizes a transport service to fetch e-mail recipient and e-mail sender information from an active directory ("AD") and cache the information. Recipient information is used to route e-mail messages to the correct mailbox. The message context information 112 can include the e-mail recipient and sender information so that this information can be transferred to the next hop (e.g., the SMTP server computer 104) thereby saving the SMTP server computer 104 the resources that would otherwise be used to fetch the e-mail recipient and sender information from the AD. This is but one example of the message context information 112 being used to improve the performance of a feature or operation, which, in this example, is a transport service utilized by MICROSOFT EXCHANGE. This example is continued below with reference to FIG. 4. The description of FIG. 4 refers to this caching capability as ADRecipient Cache ("ADRC").

Figure 4:
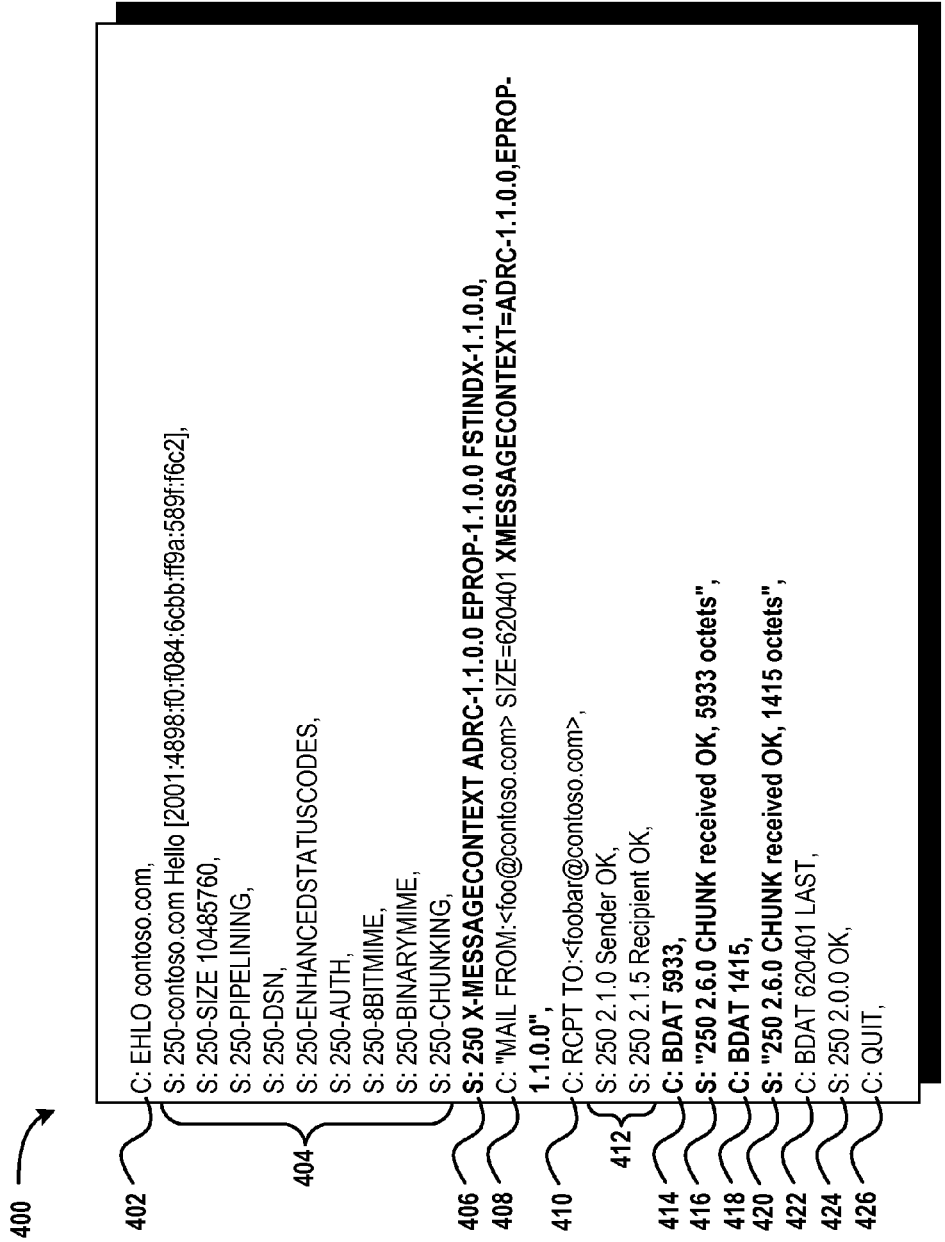
FIG. 4 is a diagram illustrating an ESMTP session during which message context information is transferred using ESMTP BDAT chunking, according to an illustrative embodiment.

In some embodiments, the SMTP client application 110 operates as an MDA. In these embodiments, the SMTP client application 110 may use the message context information 112 to ensure proper functioning of a service. For instance, as additional features are added to an e-mail service, such as MICROSOFT EXCHANGE, or the e-mail service is re-architected or reconfigured in some way, additional information may need to be transferred between computers exchanging e-mail messages to ensure proper functioning of the e-mail service. Exchanging the additional information using a new SMTP extension command designed for this purpose is likely to be blocked by firewalls, thereby preventing the e-mail service from working properly, especially in enterprise e-mail environments, which often employ strict firewall parameters to thwart potential malicious activity originating from e-mail communications. This example is also continued below with reference to FIG. 4. The description of FIG. 4 refers to this additional information as Extended Properties ("EPROP"). These are properties associated with an e-mail message and each recipient of the e-mail message. In FIG. 4, these properties are used to ensure proper functioning of a mailbox delivery operation and are transferred from the SMTP client computer 102 to the SMTP server computer 104 in the message context information 112.

As another example, the message context information 112 can include index information. For instance, an e-mail message may be indexed by a mailbox delivery operation before delivering the e-mail message. If the e-mail message contains multiple recipients, and if the recipient's mailboxes are located in different physical servers, an indexing operation is typically performed multiple times. Using the functionality described herein, the index information can be computed once at the SMTP client computer 102 and added to the message context information 112 for delivery to the SMTP server computer 104. The SMTP server computer 104 can use the index information instead of having to compute it, thereby saving processing resources. This example is also continued below with reference to FIG. 4. The description of FIG. 4 refers to the index information as Fast Index information ("FSTINDX").

It should be understood that the above-described examples are merely illustrative of the types of information that can be included in the message context information 112. As such, these examples should not be interpreted as being limiting in any way.

The SMTP client computer 102 may have one or more types of message context information to send to the SMTP server computer 104. Multiple types of message context information are illustrated in FIG. 1 as message context information A 112A, message context information B 112B, and message context information N 112N. Although the SMTP client computer 102 may have the message context information A 112A and the message context information B 112B, for example, the SMTP server computer 104 may not be configured to utilize the message context information A 112A and/or the message context information B 112B. Likewise, the SMTP server computer 104 may have the capability to utilize message context information that the SMTP client computer 102 does not have.

The SMTP server computer 104 is configured to execute a server operating system 114 and one or more application programs such as, in the illustrated embodiment, an SMTP server application 116. The server operating system 114 is a computer program for controlling the operation of the SMTP server computer 104. The SMTP server application 116 is an executable program configured to execute on top of the server operating system 114 to provide various functionality described herein. In some embodiments, the SMTP server application 116 is an MTA configured to accept e-mail messages received from the SMTP client computer 102. The SMTP server application 116 is also configured to receive the message context information 112 from the SMTP client computer 102. The SMTP server application 116 is configured to utilize SMTP and ESMTP protocols.

The SMTP server computer 104 includes one or more capabilities 118 to utilize message context information, such as the message context information 112. The capabilities 118 are illustrated as a capability A 118A, a capability B 118B, and a capability N 118N. For ease of description and not limitation, the capability A 118A and the capability B 118B are described herein as capabilities to receive and utilize the message context information A 112A and the message context information B 112B, respectively. As described above, the SMTP server computer 104 may include additional capabilities, such as the capability N 118N, for which the SMTP client computer 102 has message context information, such as the message context information N 112N, and/or additional capabilities for which the SMTP client computer 102 does not have message context information.

The SMTP client computer 102 is configured to generate SMTP client commands 120 and send the SMTP client commands 120 to the SMTP server computer 104 to, at least in part, establish an ESMTP session and to transfer the message context information 112 to the SMTP server computer 104 during the ESMTP session. The SMTP server computer 104 is configured to generate SMTP server responses 122 and send the SMTP server responses 122 to the SMTP client computer 102 to, at least in part, establish the ESMTP session, to acknowledge successful receipt of the SMTP client commands 120, to advertise the capabilities 118 of the SMTP server computer 104, and to receive the message context information 112 from the SMTP client computer 102. The SMTP client commands 120 and the SMTP server responses 122 may include SMTP commands/responses and ESMTP commands/responses.

The SMTP client computer 102, using the SMTP client application 110, generates an extended hello ("EHLO") ESMTP command and sends the EHLO command to the SMTP server computer 104. In response, the SMTP server computer 104 generates a message context capability advertisement 124 including an identification of the one or more capabilities 118 of the SMTP server computer 104 to receive one or more types of message context information, which the SMTP client computer 102 may or may not have available to send. In some embodiments, the message context capability advertisement 124 is an EHLO message keyword starting with an "X", such as, for example, "X-MESSAGECONTEXT" followed by a list of the one or more capabilities 118 that are being advertised. An illustrative message context capability advertisement is illustrated in FIG. 4 and described in greater detail below.

Assuming the message context information 112 is associated with one or more of the advertised capabilities 118 identified in the message context capability advertisement 124, the SMTP client computer 102 generates a MAIL command including a message context parameter 126 that includes an indication that the SMTP client computer 102 will utilize one or more of the advertised capabilities 118. The SMTP client computer 102 then sends the MAIL command including the message context parameter 126 to the SMTP server computer 104 to notify the SMTP server computer 104 to expect the message context information 112. An illustrative message context parameter is illustrated in FIG. 4 and described in greater detail below.

Figure 2:
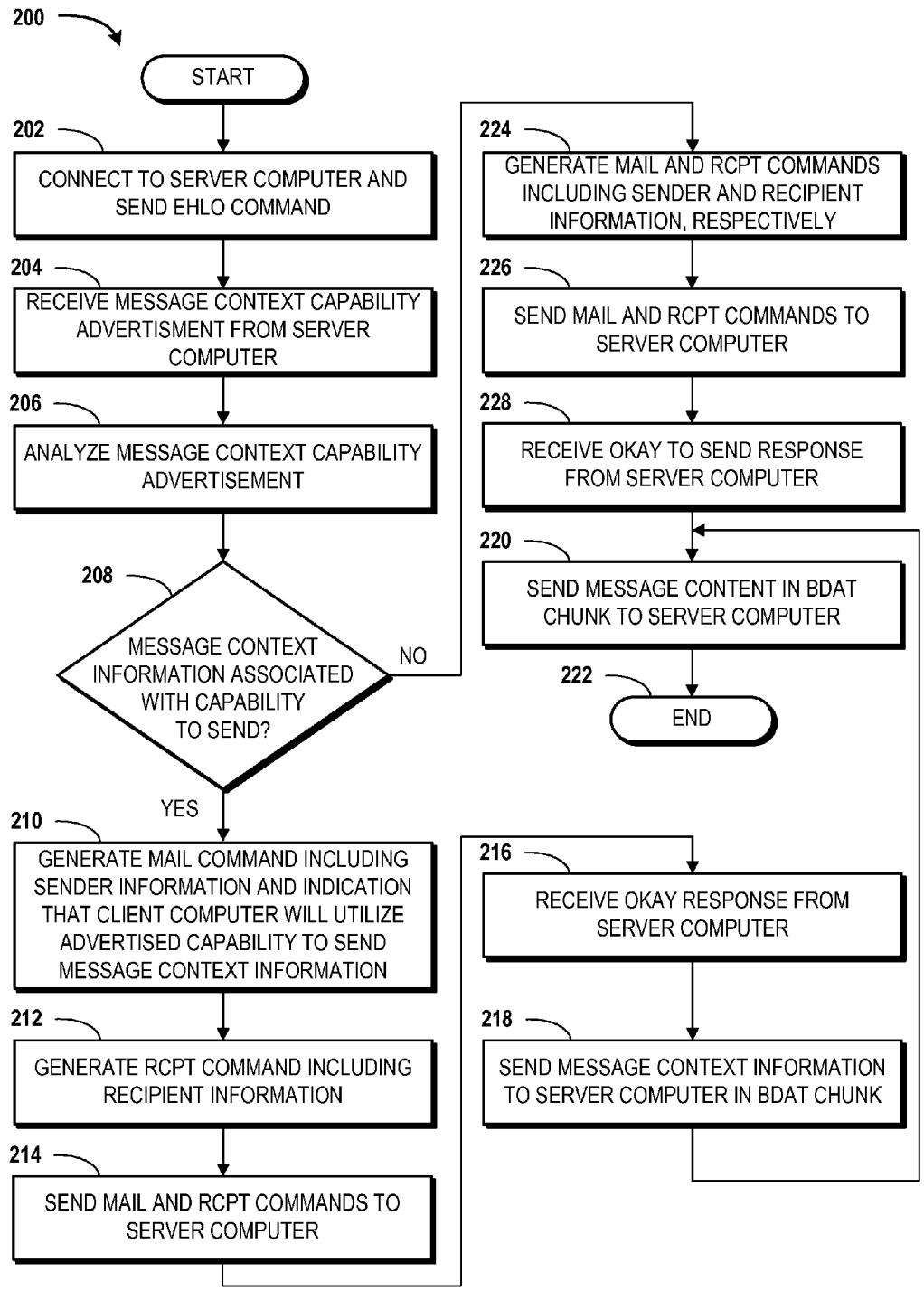
FIG. 2 is a flow diagram showing aspects of a method for transferring message context information using ESMTP BDAT chunking from the perspective of a client computer, according to an illustrative embodiment.

Turning now to FIG. 2, aspects of a method 200 for transferring message context information using ESMTP BDAT chunking from the perspective of the SMTP client computer 102 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the SMTP client computer 102 and the SMTP server computer 104 and, more particularly, the SMTP client application 110 executing on the SMTP client computer 102 and the SMTP server application 116 executing on the SMTP server computer 104. It should be understood that these embodiments are illustrative, and should not be viewed as being limiting in any way. The method 200 is now described with reference to FIGS. 2 and 3.

The method 200 begins and proceeds to operation 202, wherein the SMTP client computer 102 connects to the SMTP server computer 104. Also at operation 202, the SMTP client computer 102 sends an EHLO command to the SMTP server computer 104. From operation 202, the method 200 proceeds to operation 204, wherein the SMTP client computer 102 receives the message context capability advertisement 124 from the SMTP server computer 104. The message context capability advertisement 124 advertises one or more capabilities of the SMTP server computer 104 to utilize message context information. For instance, the message context capability advertisement 124 can advertise the capability A 118A, the capability B 118B, the capability N 118N, or some combination thereof to the SMTP client computer 102. The one or more capabilities advertised in the message context capability advertisement 124 are referred to as the advertised capability 118 for the remainder of the descriptions of FIGS. 1 and 2 for ease of explanation and not limitation.

From operation 204, the method 200 proceeds to operation 206, wherein the SMTP client computer 102 analyzes the message context capability advertisement 124. At operation 208, the SMTP client computer 102 determines, based upon the analysis at operation 206, if the message context information 112 includes information associated with the advertised capability 118 identified in the message context capability advertisement 124. For instance, if the advertised capability 118 includes the capability A 118A and the message context information A 112A is for utilization by the capability A 118A, the SMTP client computer 102 can determine, at operation 208, that it has message context information associated with the advertised capability 118 to send to the SMTP server computer 104. More particularly, at operation 208, the SMTP client computer 102 determines, based upon the analysis at operation 206, if it has any blobs associated with the advertised capability 118 to send to the SMTP server computer 104. A blob is used herein to identify a serialized/encoded value of some message context information, such as at least a portion of the message context information 112A in the above example.

If, at operation 208, the SMTP client computer 102 determines, based upon the analysis at operation 206, that the message context information 112 includes information associated with the advertised capability 118 (i.e., the SMTP client computer 102 has one or more blobs of message context information to send), the method 200 proceeds to operation 210, wherein the SMTP client computer 102 generates a MAIL command including sender information for an e-mail message and the message context parameter 126 to indicate to the SMTP server computer 104 that the SMTP client computer 102 will utilize the advertised capability 118. In embodiments in which the SMTP client computer 102 has more than one blob to send to the SMTP server computer 104, the MAIL command further includes a specification of an order in which to expect the blobs. From operation 210, the method 200 proceeds to operation 212, wherein the SMTP client computer 102 generates a recipient ("RCPT") command including recipient information for the e-mail message. At operation 214, the SMTP client computer 102 sends the MAIL and RCPT commands to the SMTP server computer 104. In response to sending the MAIL and RCPT commands to the SMTP server computer 104 at operation 214, and assuming that the SMTP server computer 104 has successfully received the MAIL and RCPT commands, at operation 216, the SMTP client computer 102 receives an okay response from the SMTP server computer 104. The okay response acknowledges successful receipt of the MAIL and RCPT commands.

From operation 216, the method 200 proceeds to operation 218, wherein the SMTP client computer 102 sends the blob of the message context information 112 to the SMTP server computer 104 in a BDAT chunk. In embodiments in which the SMTP computer 102 has more than one blob of the message context information 112 to send, the SMTP client computer 102 sends each blob in the order specified in the MAIL command in a separate BDAT chunk. After the SMTP client computer 102 sends the one or more blobs of the message context information 112 to the SMTP server computer 104, the method 200 proceeds to operation 220, wherein the SMTP client computer 102 sends message content for the e-mail message in one or more BDAT chunks. Since the SMTP server computer 104 knows the total number of blobs of message context information to expect and the order in which the blobs are to be sent, the SMTP server computer 104 can deserialize the message context information 112 included in each blob appropriately and then treat any additional BDAT chunks as part of the message content for the e-mail message. From operation 220, the method 200 proceeds to operation 222. The method 200 ends at operation 222.

If, at operation 208, the SMTP client computer 102 determines, based upon the analysis at operation 206, that the message context information 112 does not include information associated with the advertised capability 118 (i.e., the SMTP client computer 102 does not have one or more blobs of message context information to send), the method 200 proceeds to operation 224, wherein the SMTP client computer 102 generates a MAIL command including sender information for an e-mail message. Also at operation 224, the SMTP client computer 102 generates a RCPT command including recipient information for the e-mail message. From operation 224, the method 200 proceeds to operation 226, wherein the SMTP client computer 102 sends the MAIL and RCPT commands to the SMTP server computer 104. In response to sending the MAIL and RCPT commands to the SMTP server computer 104 at operation 228, and assuming that the SMTP server computer 104 has successfully received the MAIL and RCPT commands, at operation 228, the SMTP client computer 102 receives an okay response from the SMTP server computer 104. The okay response acknowledges successful receipt of the MAIL and RCPT commands. The method 200 then proceeds to operation 220, wherein the SMTP client computer 102 sends message content for the e-mail message in one or more BDAT chunks to the SMTP server computer 104. Alternatively, the SMTP client computer 102 may send the message content using a DATA command instead of a BDAT command. In any case, the method 200 then proceeds to operation 222, wherein method 200 ends.

In some embodiments, the SMTP client computer 102 splits one or more of the blobs into two or more BDAT chunks prior to sending the blobs to the SMTP server computer 104. In these embodiments, the total size of each blob can be specified in the MAIL command so the SMTP server computer 104 knows when an entire blob has been received.

Figure 3:
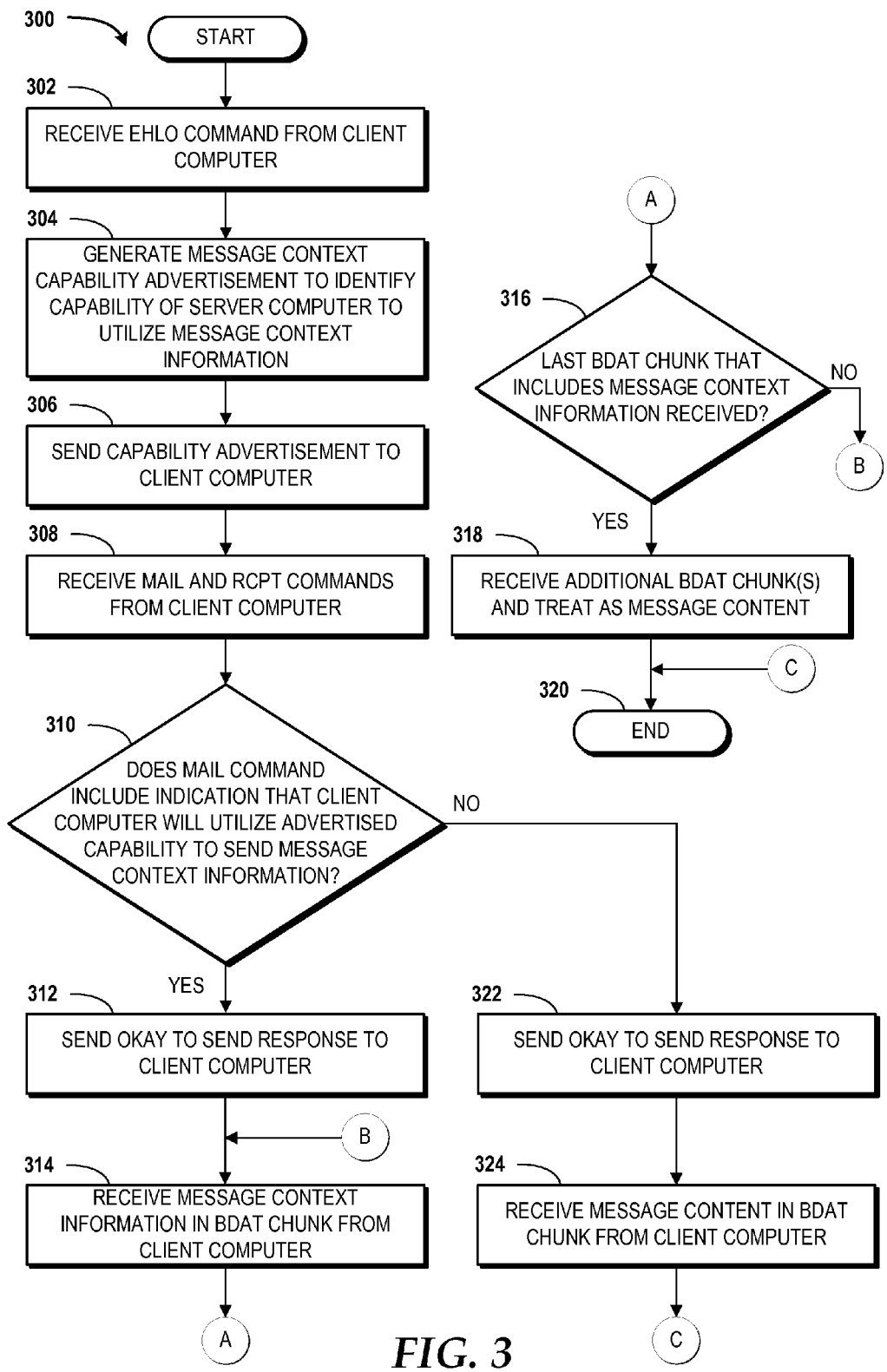
FIG. 3 is a flow diagram showing aspects of a method for transferring message context information using ESMTP BDAT chunking from the perspective of a server computer, according to an illustrative embodiment.

Turning now to FIG. 3, aspects of a method 300 for transferring message context information using ESMTP BDAT chunking from the perspective of the SMTP server computer 104 will be described in detail. The method 300 begins and proceeds to operation 302, wherein the SMTP server computer 104 receives an EHLO command from the SMTP client computer 102. From operation 302, the method 300 proceeds to operation 304, wherein the SMTP server computer 104 generates the message context capability advertisement 124. At operation 306, the SMTP server computer 104 sends the message context capability advertisement 124 to the SMTP client computer 102. From operation 306, the method 300 proceeds to operation 308, wherein the SMTP server computer 104 receives MAIL and RCPT commands from the SMTP client computer 102.

From operation 308, the method 300 proceeds to operation 310. At operation 310, the SMTP server computer 104 determines if the MAIL command includes an indication that the SMTP client computer 102 will utilize the advertised capability 118 to send message context information. If, at operation 310, the SMTP server computer 104 determines that the MAIL command includes the message context parameter 126 indicating that the SMTP client computer 102 will utilize the advertised capability 118 to send one or more blobs of the message context information 112, the method 300 proceeds to operation 312. In embodiments in which the SMTP client computer 102 has more than one blob of the message context information 112 to send, the MAIL command specifies an order in which each blob will be sent. At operation 312, the SMTP server computer 104 sends an okay response to the SMTP client computer 102 to acknowledge successful receipt of the MAIL and RCPT commands.

At operation 314, the SMTP server computer 104 receives one or more blobs of the message context information 112, wherein each blob is received in a separate BDAT chunk. From operation 314, the method 300 proceeds to operation 316, wherein the SMTP server computer 104 determines if the last BDAT chunk that includes a blob of the message context information 112 has been received based upon the order specified in the MAIL command. If the SMTP client computer 102 has committed to send only one blob of the message context information 112 as specified in the MAIL command, the SMTP server computer 104 determines that only a single blob of the message context information 112 should be received. As such, at operation 316, the SMTP server computer 104 can determine that the BDAT chunk including the blob of the message context information 112 received at operation 314 is the last BDAT chunk that includes a blob of the message context information 112 and the method 300 proceeds to operation 318. Alternatively, if the MAIL command specifies an order in which the SMTP client computer 102 has committed to send blobs of the message context information 112 and the BDAT chunk including the blob of the message context information 112 received at operation 314 is identified in the order as being the last BDAT chunk, the method 300 proceeds to operation 318. Otherwise, the SMTP server computer 104 determines, at operation 316, that one or more additional BDAT chunks are available and returns to operation 314.

At operation 318, the SMTP server computer 104 receives message content for the e-mail message in one or more BDAT chunks from the SMTP client computer 102. The SMTP server computer 104 treats these BDAT chunks as message content based upon the determination at operation 316 that it has received all of the blobs of the message context information 112. The method 300 then proceeds to operation 320. The method ends at operation 320.

If, at operation 310, the SMTP server computer 104 determines that the MAIL command does not include the message context parameter 126 indicating that the SMTP client computer 102 will utilize the advertised capability 118 to send one or more blobs of the message context information 112, the method 300 proceeds to operation 322. At operation 322, the SMTP server computer 104 sends an okay response to the SMTP client computer 102 to acknowledge successful receipt of the MAIL and RCPT commands. The method 300 then proceeds to operation 324, wherein the SMTP server computer 104 receives message content for the e-mail message in one or more BDAT chunks from the SMTP client computer 102. The method 300 then proceeds to operation 320, wherein the method 300 ends.

Turning now to FIG. 4, a diagram illustrating an illustrative ESMTP session 400 will be described in detail. The SMTP session 400 is a simplified ESMTP protocol session used for purposes of illustrating and describing an illustrative ESMTP command flow between a client ("C"), such as the SMTP client computer 102 and a server ("S"), such as the SMTP server computer 104, in accordance with the aspects disclosed herein. The ESMTP session 400 begins when the SMTP client computer 102 sends an EHLO command 402 to the SMTP server computer 104. In response, the SMTP server computer 104 responds with a multi-line response 404 including the capabilities that the SMTP server computer 104 supports. The SMTP server computer 104 also responds with a message context capability advertisement 406 identifying the capability of the SMTP server computer 104 to utilize various types of message context information. More specifically, the message context capability advertisement 406 states, "X-MESSAGECONTEXT ADRC-1.1.0.0 EPROP-1.1.0.0 FSTINDX-1.1.0.0," to indicate to the SMTP client computer 102 that the SMTP server computer 104 supports the message context capabilities of AD Recipient Cache ("ADRC"), Extended Properties ("EPROP"), and Fast Index ("FSTINDX"), each of which is described in greater detail above. It should be understood, however, that the message context capability advertisement 406 may identify any capability of the SMTP server computer 104 to receive and utilize arbitrarily long message context information. As such, the illustrated embodiment of the message context capability advertisement 406 should not be interpreted as being limiting in any way. Moreover, although the "X-MESSAGECONTEXT" keyword is used in the illustrated embodiment to introduce the various message context capabilities supported by the SMTP server computer 104, alternative keywords may be used and are contemplated.

Message context information can change across different versions of software installed on the SMTP client computer 102 and/or the SMTP server computer 104, thereby potentially causing incompatibilities between the SMTP client computer 102 and the SMTP server computer 104 with regard to the exchange of message context information as described above with reference to FIGS. 2 and 3. In some embodiments, the SMTP client computer 102 and the SMTP server computer 104 are configured to support versioning for message context information. In these embodiments, when the SMTP server computer 104 advertises its capability to receive message context information, the SMTP server computer 104 can also send the version of the capability it supports. For example, the illustrated message context capability advertisement 406 includes a version for each of the capabilities to indicate to the SMTP client computer 102 the version of each capability supported by the SMTP server computer 104. In the illustrated embodiment, the version for each capability is "1.1.0.0."

The SMTP client computer 102 can inspect the version and determine whether or not to send the message context information. If the version of the capability supported by the SMTP client computer 102 is not compatible with the version of the capability supported by the SMTP server computer 104, the SMTP client computer 102 can determine to not send the message context information. In some embodiments, the SMTP client computer 102 utilizes different logic to determine the compatibility of different message context information. In some embodiments, one or more blobs of message context information are considered to be mandatory and the SMTP client computer 102 is configured to always send these blobs. In these embodiments, the higher version between the SMTP client computer 102 and the SMTP server computer 104 is configured to perform the conversion from the lower version to the higher version or from the higher version to the lower version, as appropriate. For instance, if a lower version client sends a mandatory blob to a higher version server, the server is configured to perform the up-conversion upon or at a time after receiving the blob. Similarly, if a higher version client tries to send a mandatory blob to a lower version server, the client is configured to down-convert the blob before sending it to the server.

In response to the message context capability advertisement 406, the SMTP client computer 102 sends a MAIL command 408 to the SMTP server computer 104. The MAIL command 408 identifies the start of an e-mail message transfer by identifying the e-mail address of the sender of the message via a FROM parameter, a size of the message via a SIZE parameter, and which of the capabilities advertised by the SMTP server computer 104 in the message context capability advertisement 406 the SMTP client computer 102 will utilize via an XMESSAGECONTEXT parameter. In the illustrated embodiment, the XMESSAGECONTEXT parameter identifies to the SMTP server computer 104 the ADRC and EPROP capabilities. Moreover, in the illustrated embodiment, by not identifying the FSTINDX capability in the XMESSAGECONTEXT parameter, the SMTP client computer 102 is indicating to the SMTP server computer 104 that it will not utilize the FSTINDX capability.

Also in response to receiving the message context capability advertisement 406, the SMTP client computer 102 sends a RCPT command 410 to the SMTP server computer 104 to identify one or more recipients of the message. The SMTP server computer 104 responds to the MAIL command 408 and the RCPT command 410 with okay responses 412 to acknowledge successful receipt of the sender and recipient information. The SMTP client computer 102 can then send one or more blobs of message context information associated with the capabilities identified in the XMESSAGECONTEXT parameter of the MAIL command 408. In the illustrated embodiment, the SMTP client computer 102 sends multiple blobs each in a separate BDAT chunk, as will now be described.

The SMTP client computer 102 sends a first BDAT chunk 414 to the SMTP server computer 104. The first BDAT chunk 414 includes a length of "5933" octets for a first blob of the message context information. This indicates to the SMTP server computer 104 that the first BDAT chunk 414 includes "5933" octets. The SMTP server computer 104 responds with a first BDAT chunk received response 416 to acknowledge successful receipt of the first BDA chunk 414. The SMTP client computer 102 then sends a second BDAT chunk 418 to the SMTP server computer 104. The second BDAT chunk 418 includes a length of "1415" octets for a second blob of the message context information. This indicates to the SMTP server computer 104 that the second BDAT chunk 418 includes "1415" octets. The SMTP server computer 104 responds with a second BDAT chunk received response 420 to acknowledge successful receipt of the second BDAT chunk 418. The SMTP client computer 102 then sends a third BDAT chunk 422 including a LAST parameter to indicate to the SMTP server computer 104 that this is the last chunk of message data to be sent. The third BDAT chunk 422 includes "620401" octets for a message body.

In the illustrated embodiment, the first BDAT chunk 414 and the second BDAT chunk 418 include blobs of message context information, while the third BDAT chunk 422 includes the message content. Since the SMTP server computer 104 knows the number of blobs to expect and the order in which the blobs are be sent, the SMTP server computer 104 can deserialize the message context information included in the blobs appropriately. Every BDAT chunk after the message context information BDAT chunks (i.e., the BDAT chunks that include a blob of message context information) are treated by the SMTP server computer 104 as message content. In the illustrated embodiment, since the third BDAT chunk 422 includes the LAST parameter, the SMTP server computer 104 can infer that the third BDAT chunk 422 includes the message content for the e-mail message.

The SMTP server computer 104 responds to the third BDAT chunk 422 with a third BDAT chunk received response 424 to acknowledge successful receipt of the third BDAT chunk 422. The SMTP client computer 102 then sends a QUIT command 426 to the SMTP server computer 104 to signal the end of the ESMTP session 400.

Figure 5:
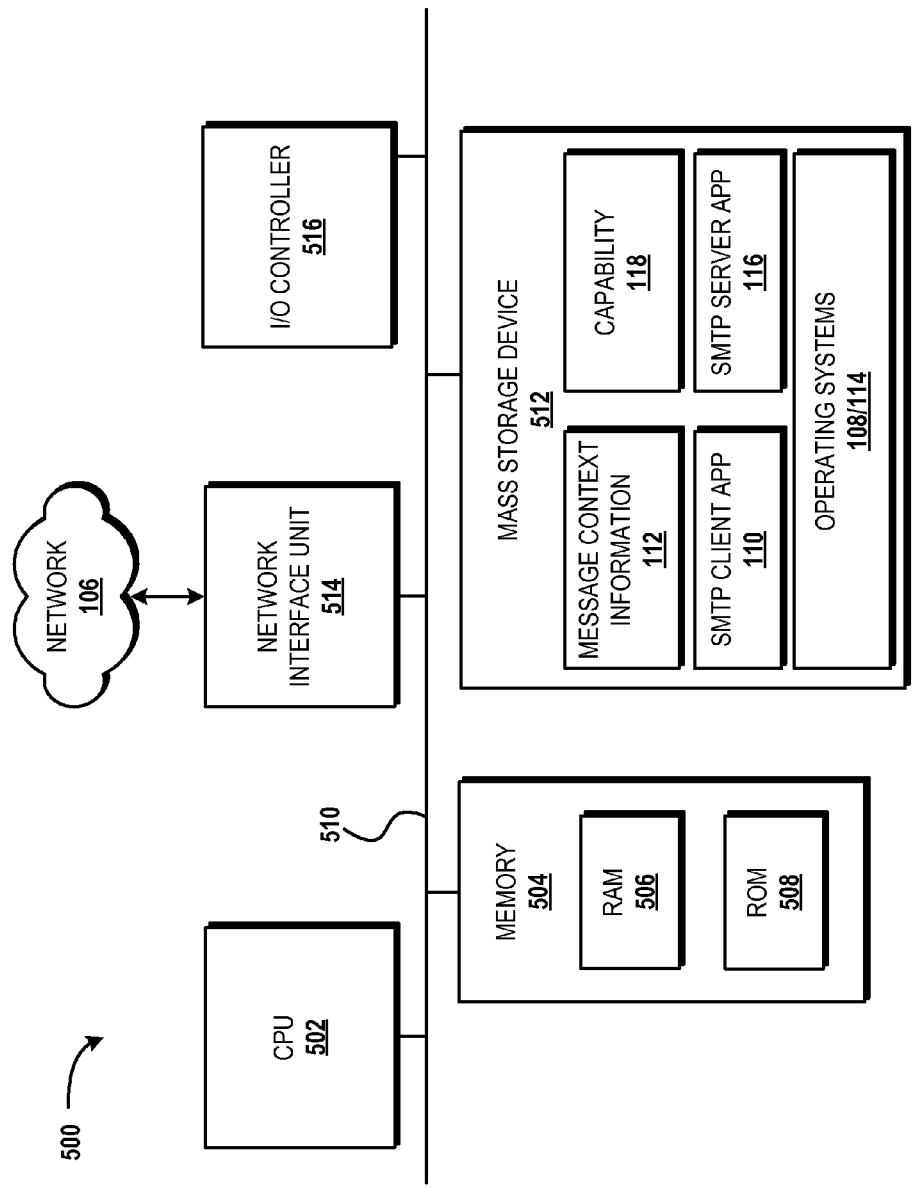
FIG. 5 is a computer architecture diagram illustrating an illustrative computer hardware and software architecture for a computing system capable of implementing aspects of the embodiments presented herein.

FIG. 5 illustrates an illustrative computer architecture 500 for a device capable of executing the software components described herein for transferring message context information using ESMTP BDAT chunking Thus, the computer architecture 500 illustrated in FIG. 5 illustrates an architecture for a PC, a desktop workstation, a laptop computer, a tablet computer, a notebook computer, an ultraportable computer, a PDA, an electronic-book reader, a mobile telephone, a game console, a set-top box, a consumer electronics device, a server computer, or any other type of computing system configured to perform the various operations described herein for transferring message context information using ESMTP BDAT chunking. The computer architecture 500 may be utilized to execute any aspects of the software components presented herein.

In some embodiments, the SMTP client computer 102 and/or the SMTP server computer 104 are configured in accordance with the computer architecture 500. As such, software components of the SMTP client computer 102 and the SMTP server computer 104 are shown together within the computer architecture 500 for ease of illustration. It should be understood, however, that these software components may be and are likely to be implemented in separate computers, such as in a client/server configuration, or as standalone software components executing on one or both of the SMTP client computer 102 and the SMTP server computer 104.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the client operating system 108, the server operating system 114, the SMTP client application 110, the message context information 112, the capability 118, and the SMTP server application 116.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 106. The computer architecture 500 may connect to the network 106 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, electronic stylus, touch screen, microphone, or other input device (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for transferring message context information using ESMTP BDAT chunking have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for transferring message context information of a message during an extended simple mail transfer protocol ("ESMTP") session, the computer-implemented method comprising performing computer-implemented operations for:
    transmitting, from a first computer, an extended hello command to query for capabilities of the second computer to utilize the message context information of the message;
    receiving, at the first computer, a message context capability advertisement from the second computer in response to the extended hello command, the message context capability advertisement identifying a capability of the second computer to utilize the message context information;
    analyzing, at the first computer, the message context capability advertisement to determine if the first computer has access to the message context information;
    in response to determining that the first computer has access to the message context information, generating, at the first computer, a MAIL command comprising a message context parameter to indicate to the second computer that the first computer will utilize the capability,
    sending the MAIL command to the second computer, and
    receiving an okay response from the second computer, the okay response indicating successful receipt of the MAIL command; and
    in response to receiving the okay response, sending the message context information to the second computer in an ESMTP binary data ("BDAT") chunk.

2. The computer-implemented method of claim 1, further comprising:
    generating, at the first computer, an ESMTP extended hello ("EHLO") command; and
    sending the ESMTP EHLO command to the second computer,
    wherein receiving the message context capability advertisement comprises receiving the message context capability advertisement in response to the ESMTP EHLO command.

3. The computer-implemented method of claim 2, wherein analyzing, at the first computer, the message context capability advertisement to determine if the first computer has access to the message context information comprises analyzing, at the first computer, the message context capability advertisement to determine if the first computer has access to one or more blobs associated with the capability to send to the second computer, the one or more blobs each identifying a serialized value of at least a portion of the message context information.

4. The computer-implemented method of claim 3, wherein, in response to determining that the first computer has access to more than one blob associated with the capability to send to the second computer, generating, at the first computer, the MAIL command comprising an order in which to expect the blobs and the message context parameter to indicate to the second computer that the first computer will utilize the capability.

5. The computer-implemented method of claim 4, wherein sending the message context information to the second computer in the BDAT chunk comprises sending each of the blobs to the second computer in a separate BDAT chunk.

6. The computer-implemented method of claim 5, further comprising specifying a total size of the blobs in the MAIL command to provide a notification to the second computer when all of the blobs have been received.

7. The computer-implemented method of claim 4, further comprising, splitting one or more of the blobs into two or more BDAT chunks prior to sending the blobs to the second computer; and wherein the MAIL command further comprise a total size of each of the blobs.

8. The computer-implemented method of claim 1, wherein the first computer is configured to execute a first mail transfer agent ("MTA") and the second computer is configured to execute a second MTA.

9. The computer-implemented method of claim 1, wherein:
    the first computer is configured to execute a first mail transfer agent ("MTA") and the second computer is configured to execute a mail delivery agent ("MDA"); or
    the first computer is configured to execute a mail user agent ("MUA") and the second computer is configured to execute a MTA.

10. The computer-implemented method of claim 1, wherein the message context information is utilized to improve a performance of a feature or operation.

11. The computer-implemented method of claim 1, wherein the message context information is utilized to ensure proper functioning of a feature or operation.

12. A server computer system, comprising:
a processor; and
a memory in communication with the processor, the memory having computer-readable instructions stored thereupon that, when executed by the processor, cause the processor to
receive, from a client computer system at the server computer system, an extended hello command to query for capabilities of the server computer system to utilize message context information of a message,
generate a message context capability advertisement in response to the extended hello command, the message context capability advertisement identifying a capability of the server computer system to utilize the message context information and a version of the message context capability supported by the server computer system,
cause the message context capability advertisement to be sent to the client computer system,
receive a MAIL command from the client computer system, the MAIL command comprising a message context parameter indicating that the client computer system will utilize the capability,
generate an okay response indicating successful receipt of the MAIL command,
cause the okay response to be sent to the client computer system, and to
receive the message context information from the client computer system in an extended simple mail transfer protocol ("ESMTP") binary data ("BDAT") chunk.

13. The server computer system of claim 12, wherein the computer-readable instructions that, when executed by the processor, cause the processor to receive the message context information from the client computer system in the ESMTP binary chunk comprise computer-readable instructions that, when executed by the processor, cause the processor to receive one or more blobs, the one or more blobs each identifying a serialized value of at least a portion of the message context information.

14. The server computer system of claim 13, wherein the MAIL command further comprises an order in which to expect the blobs.

15. The server computer system of claim 14, wherein the computer-readable instructions that, when executed by the processor, cause the processor to receive the message context information from the client computer system in the ESMTP BDAT chunk comprise computer-readable instructions that, when executed by the processor, cause the processor to receive each of the blobs from the client computer system in a separate BDAT chunk in the order specified in the MAIL command.

16. The server computer system of claim 15, wherein the computer-readable instructions further comprise computer-readable instructions that, when executed by the processor, cause the processor to:
determine that a last BDAT chunk that includes the message context information has been received;
receive a further BDAT chunk; and
treat data included in the further BDAT chunk as message content for an e-mail message.

17. The server computer system of claim 12, wherein the server computer system is operating as a mail transfer agent ("MTA") or as a mail delivery agent ("MDA").

18. An optical disk, a magnetic storage device, or a solid state storage device having computer-readable instructions stored thereupon that, when executed by a server computer, cause the server computer to:
receive an extended simple mail transfer protocol ("ESMTP") extended hello ("EHLO") command from a client computer comprising a query for capabilities to utilize message context information of a message;
in response to receiving the ESMTP EHLO command from the client computer, generate a message context capability advertisement, the message context capability advertisement identifying a capability of the server computer to utilize the message context information;
cause the message context capability advertisement to be sent to the client computer;
receive a MAIL command from the client computer, the MAIL command comprising
sender information for an e-mail message,
an order in which to send each blob of a plurality of blobs, and
a message context parameter comprising an indication that the client computer will utilize the capability to send the plurality of blobs to the server computer in the order, each blob of the plurality of blobs identifying a serialized value of at least a portion of the message context information;
generate an okay response indicating successful receipt of the MAIL command;
cause the okay response to be sent to the client computer;
receive a plurality of ESMTP binary data ("BDAT") chunks from the client computer, each BDAT chunk of the plurality of BDAT chunks comprising one of the plurality of blobs;
determine that a last BDAT chunk that includes one of the plurality of blobs has been received;
receive a further BDAT chunk; and
treat data included in the further BDAT chunk as message content for the e-mail message.

19. The optical disk, the magnetic storage device, or the solid state storage device of claim 18, wherein the computer-readable instructions that, when executed by the server computer, cause the server computer to generate the message context capability advertisement comprising a version of the capability; and further having computer-readable instructions that, when executed by the server computer, cause the server computer to perform an up-conversion on the plurality of blobs from a lower version utilized by the client computer to the version advertised in the message context capability advertisement.

20. The optical disk, the magnetic storage device, or the solid state storage device of claim 18, wherein the computer-readable instructions that, when executed by the server computer, cause the server computer to generate the message context capability advertisement comprising a version of the capability; and wherein the plurality of blobs are received in the plurality of BDAT chunks from the client computer having been down-converted by the client computer from a higher version utilized by the client computer to the version advertised in the message context capability advertisement.

* * * * *